US008463896B2

(12) United States Patent
Breau et al.

(10) Patent No.: US 8,463,896 B2
(45) Date of Patent: Jun. 11, 2013

(54) DYNAMIC PORTAL CREATION BASED ON PERSONAL USAGE

(75) Inventors: Jeremy R. Breau, Kansas City, MO (US); Robert Pippert, Lenexa, KS (US); Douglas R. Green, Lenexa, KS (US); Lyle W. Paczkowski, Mission Hills, KS (US); Samuel M. Woleben, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 303 days.

(21) Appl. No.: 12/188,659

(22) Filed: Aug. 8, 2008

(65) Prior Publication Data
US 2010/0036933 A1 Feb. 11, 2010

(51) Int. Cl.
*G06F 15/173* (2006.01)
*G06F 15/16* (2006.01)
*G06F 3/048* (2006.01)
*G06Q 30/00* (2012.01)

(52) U.S. Cl.
USPC ......... 709/224; 709/203; 715/810; 705/14.73

(58) Field of Classification Search
None
See application file for complete search history.

(56) References Cited

U.S. PATENT DOCUMENTS

| | | | |
|---|---|---|---|
| 6,167,441 A | 12/2000 | Himmel | |
| 6,775,291 B1 | 8/2004 | Ryu et al. | |
| 6,959,319 B1* | 10/2005 | Huang et al. | 709/203 |
| 7,548,612 B2 | 6/2009 | Weissman et al. | |
| 2001/0047404 A1 | 11/2001 | Suda | |
| 2003/0004984 A1 | 1/2003 | Chou | |
| 2003/0028647 A1 | 2/2003 | Grosu | |
| 2003/0065706 A1 | 4/2003 | Smyth et al. | |
| 2003/0105682 A1* | 6/2003 | Dicker et al. | 705/27 |
| 2003/0110161 A1 | 6/2003 | Schneider | |
| 2003/0185197 A1 | 10/2003 | Banerjee et al. | |
| 2003/0225885 A1 | 12/2003 | Rochberger et al. | |
| 2004/0054923 A1* | 3/2004 | Seago et al. | 713/201 |
| 2004/0139170 A1 | 7/2004 | Shen et al. | |
| 2004/0177015 A1 | 9/2004 | Galai et al. | |

(Continued)

FOREIGN PATENT DOCUMENTS

| | | |
|---|---|---|
| WO | 02091154 A2 | 11/2002 |
| WO | 2010017434 A1 | 2/2010 |

OTHER PUBLICATIONS

Foreign Patent WO 2007/071529 A1, Publication Date: Jun. 28, 2007, Name of Applicant: International Business Machines Corporation, 37 pages.

(Continued)

*Primary Examiner* — Wen-Tai Lin

(57) ABSTRACT

Methods, media and systems are provided for generating a dynamic web portal in a wireless network, and the portal is based on personal usage. An initialized portal contains no web content. Systems include one or more network elements configured to monitor requests for resource components, to generate web portals, and to dynamically update the portals based on the requests for resource components. Data structures embodied on a computer-readable media are included for storing numerical data regarding the requests and for storing a plurality of portals. The dynamic web portal is updated to contain component resources from visited web pages, each having a respective universal resource locator (URL) or portion of code with which it is associated. Requests for resources are monitored and added to a web portal when a specified threshold is surpassed so that an updated web portal can be presented.

16 Claims, 11 Drawing Sheets

U.S. PATENT DOCUMENTS

| | | | |
|---|---|---|---|
| 2004/0233898 | A1 | 11/2004 | Otsuka et al. |
| 2005/0108406 | A1* | 5/2005 | Lee et al. .................. 709/228 |
| 2006/0053090 | A1 | 3/2006 | Cotter et al. |
| 2006/0075072 | A1 | 4/2006 | Sinclair et al. |
| 2006/0248452 | A1 | 11/2006 | Lambert et al. |
| 2008/0052639 | A1* | 2/2008 | Chun et al. .................. 715/810 |
| 2008/0195761 | A1 | 8/2008 | Jabri et al. |
| 2009/0083646 | A1 | 3/2009 | Lin et al. |
| 2009/0222454 | A1 | 9/2009 | Liesche et al. |
| 2009/0222737 | A1 | 9/2009 | Liesche et al. |

OTHER PUBLICATIONS

Foreign Patent WO 02/09154 A2, Publication Date: Nov. 14, 2002, Name of Applicant: ChangingWorlds Limited, 52 pages.

Foreign Patent WO 2002/091154 A3, Publication Date: Nov. 14, 2002, Name of Applicant: ChangingWorlds Limited, 8 pages.

PCT International Searching Authority Notification of Transmittal of the International Search Report and the Written Opinion of the International Searching Authority, or the Declaration, Date of mailing: Mar. 11, 2009; International filing date: Jul. 8, 2009; Applicant: Sprint Communications Company L.P., Applicant's or Agent's file reference: SPRI140558/5, International application No. PCT/US2009/053078, 14 pages.

Non-Final Office Action, Mail Date Mar. 5, 2010; U.S. Appl. No. 12/158,854, 22 pages.

W3C Content Transformation Guidelines 1.0; W3C Working Draft April 14, 2008, Editor: Jo Rabin, 17 pages.

Final Office Action, U.S. Appl. No. 12/168,854, filed Jul. 7, 2008, Mailed Aug. 26, 2010.

* cited by examiner

DYNAMIC PORTAL CREATION BASED ON PERSONAL USAGE

SUMMARY

The present invention is defined by the claims below. A high-level overview of embodiments of the present invention are provided here for that reason, to provide an overview of the disclosure.

In a first aspect, a computer-implemented method generates a dynamic web portal based on personal usage history. The dynamic web portal contains component resources from visited web pages, wherein each component resource has a respective universal resource locator (URL) with which it is associated. The method comprises generating an initialized web portal that contains no web content. One or more requests are received to return component resources from a visited web page. Each URL associated with the requested component resources is stored. Subsequent requests for component resources are monitored. When a total number of subsequent requests for at least one component resource passes a predetermined threshold, each URL associated with the at least one requested component resource is added to the web portal. An updated web portal that includes URLs associated with the at least one requested component resource is presented.

In a second aspect, one or more computer-storage media having computer-executable instructions embodied thereon perform a method of generating dynamic web portals based on usage history. A portal is a web page displayed when a web browser is first used to browse the internet. The method comprises generating a blank portal to provide to a requesting device. The blank portal contains no web content. A request is received to retrieve a component associated with a universal resource locator (URL). The URL associated with the component is stored. A count of requests for the component is incremented upon each subsequent request for the component. An updated portal that contains the URL associated with the component is generated once the count has reached a predetermined threshold and is communicated to the requesting device.

In a third aspect, a system is provided for generating web portals that are dynamically configured to present component resources of web pages to a device based on usage history and frequency. The system includes one or more network elements configured to monitor requests for web resource components having respective associated universal resource locators (URLs). A data structure embodied on a computer-readable media is included for storing numerical data regarding the requests. The system also comprises one or more network elements configured to generate a plurality of web portals and to dynamically update the plurality of web portals based on the requests for web resource components. A data structure embodied on a computer-readable media is included for storing the plurality of web portals.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
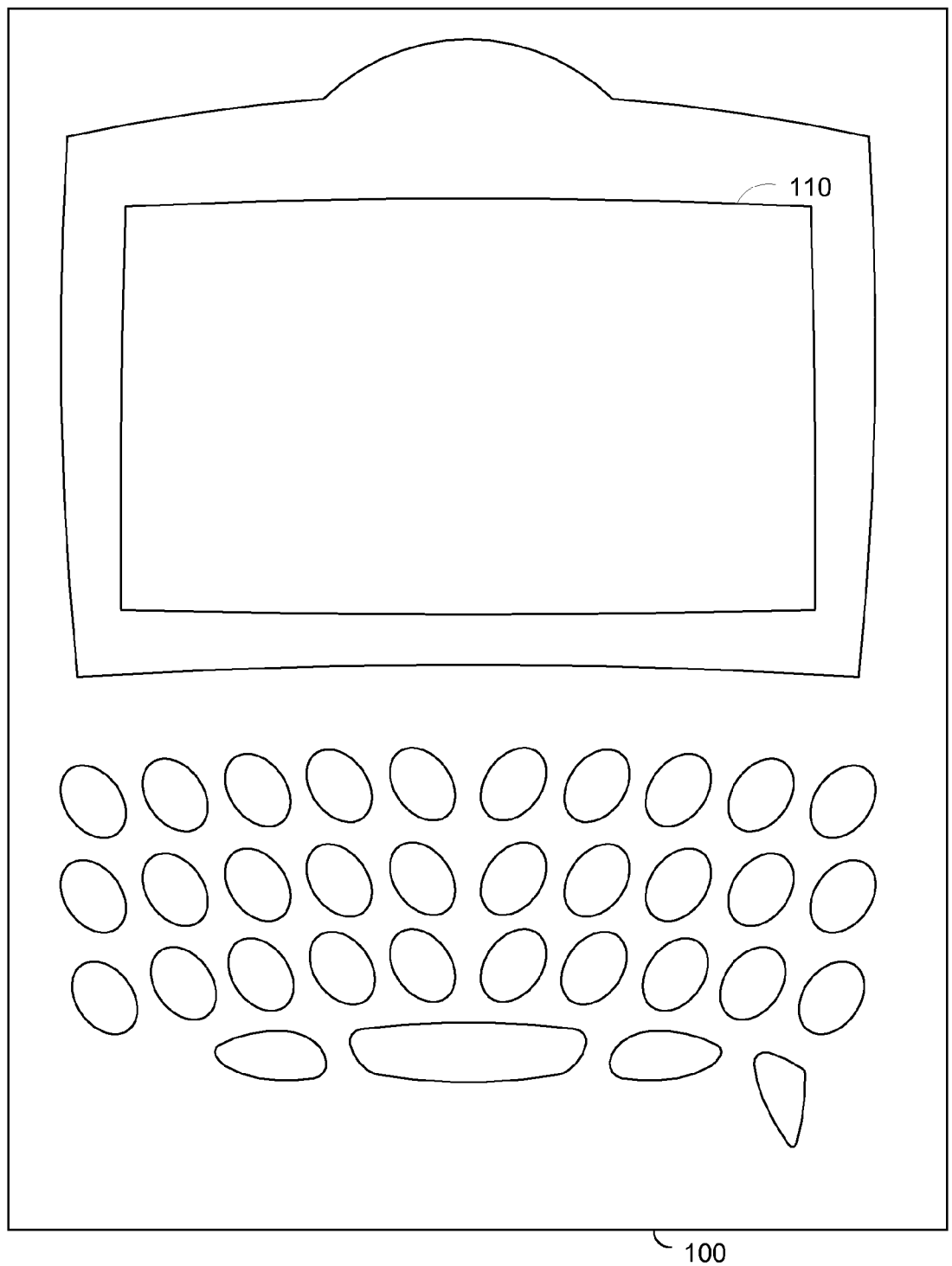
FIGS. 1-4 depict exemplary screen presentations according to embodiments of the present invention.

Embodiments of the present invention provide systems, media and methods for generating web portals that can be dynamically generated based on an individual user. Many previous systems have tried to anticipate what a user would prefer to receive from a particular web site, so that the site provider may increase intra-site traffic and enhance the user experience. This was based on the history of all visitors to the site and matching preferences of the current user against that historical data of previous users. The embodiments of the present invention provide an individually tailored experience so that the network provider can more efficiently supply content to the device based solely on that user's history. Among the many benefits this provides for the user is a quicker browsing experience accessing the content that user views on a regular basis. The network provider also enjoys many benefits. Among them are the ability to reduce overall network bandwidth consumption, as only those items the user wants to access are communicated, rather than transmitting both the desired content and various unwanted component resources.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

ASN Access Services Network
CDMA Code Division Multiple Access
CSN Connectivity Services Network
DVD Digital Versatile Disc
EEPROM Electrically Erasable Programmable Read-Only Memory
EV-DOa Evolution-Data Only, Revision A
HSPA High Speed Packet Access
HTML Hypertext Markup Language
IP Internet Protocol
LTE Long Term Evolution
PDA Personal Data Assistant
PDSN Packet Data Serving Node
RAM Random Access Memory
ROM Read-Only Memory
URL Universal Resource Locator
WiMAX Wireless Microwave Access
XHTML Extensible Hypertext Markup Language
XML Extensible Markup Language Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The following description will be given in terms of web sites and the component resources of those sites, which can be nearly limitless in variety. When browsing a web site, what a device accesses is a file coded in an markup language that the browser can parse and present. Appropriate markup languages can include hypertext markup language (HTML), extensible markup language (XML), or extensible hypertext markup language (XHTML), just to provide a few examples. Such a file is stored on a web server, making it available to those on the internet. The file may have all that is necessary to present the page contained within the file itself. However, it is more common to have numerous references within the file to the many constituent parts of the presented page.

For instance, a typical web site may have hypertext links to other parts of the site, pictures, graphics, flash objects, and action forms, such as to login or search the site. Many of these linked items will be stored elsewhere, as the file that is accessed for the primary web page includes universal resource locators (URLs) to retrieve the component resources. Other component resources may be portions of code found in the page to carry out or embed a function, such as a Javascript™ code. These code portions can carry out a myriad of functions, from changing the size of a photo when a cursor passes over it to pre-screening login input. The browser translates the file into a visual representation for the user based on the primary file, portions of code, and the components stored in other files that the primary file can also access. Thus, the site's page may be stored at an Internet Protocol (IP) address that is accessible by entering the naming convention of www.example.com/index. The various pictures, graphics and other objects presented on that page will be stored at a variety of other file locations, although typically at addresses of a related nature.

There are a variety of reasons for storing component resources separately from the page the user is browsing. Not the least of them is enhancing the browsing experience for the individual. As web sites continually add more features, there are more component resources to load and present. If all of the pictures, graphics, and objects are embedded within the page, the entire page is loaded before anything is presented to the user. A web site that has a large number of component resources may become unwieldy for the user and therefore reduce the user's desire to visit the site. On the other hand, referenced components allow the page to be loaded first and items, such as pictures or graphics, to be loaded one-by-one as they are able to be accessed.

As a more specific example of a web site, a general services web portal may have links to articles for news, general interest stories, sports, entertainment, and the like. The same portal may also have communications features, such as electronic mail services, instant messaging capabilities, and multimedia repositories for audio and video. Finally, such sites may have search engine forms, directories, and user interest groups. This list is not intended to be exhaustive, but is merely illustrative of the wide variety of component resources that can be found on web sites. Some of these component resources may actually have multiple aspects associated with them, such as a picture that is also a link to a story. Many links are similar, having either a picture or graphic for the user to select in order to access that URL. From the exemplary portal site, access to an electronic mailbox can have a mailbox graphic file and the hypertext link to a login page included. As described above, a single site may have numerous parts that make up the whole, potentially requiring each one to be accessed and loaded. A web site with tens or even hundreds of component resources would then load each individual file before all pictures, links, graphics and assorted features are available. While this is still preferable compared to waiting for a page containing all that is to be presented to load, there can still be a long wait time involved while the user waits for a individual item to load if it is not one of the first items to load.

Likewise, the network provider may utilize a great deal of bandwidth providing pictures, graphics, links, and tools that the user does not care to access. In the above example, a user may repeatedly visit a general services web portal only to check the user's electronic mailbox and to perform searches in a search form. The same user may access a different site to read news stories, such as from a television news organization's web site or from the site of a newspaper local to the user. As further examples, the user may visit additional sites and perform a login for very specific tasks, such as checking banking and financial balances, to track progress of a fantasy sports team, or visit a specific portion of a social networking site. When the user is using only these very specific portions of a web site, then the presentation of other components becomes wasteful. The network resources used to present these unwanted items could be better put to use if only those items the user truly desires to see are communicated. Unlike hard-wired access available to a desktop personal computer, a cable or direct subscriber line as examples, wireless technologies are constrained regarding bandwidth to a greater degree. When the device used to browse the web site additionally has limited capabilities, such as with a web-enabled cellular telephone or personal data assistant (PDA), the need to present only the most frequently wanted content becomes even more relevant. Thus, the following embodiments will be described in reference to current and advancing wireless technologies such as Evolution-Data Optimized revision A (EV-DOa), Long Term Evolution (LTE), High Speed Packet Access (HSPA), or Wireless Microwave Access (WiMAX) protocols. This list is not intended to be a limitation to the scope of the following description, but illustrative of the types of networks that may employ the disclosed embodiments.

Embodiments of the present invention provide this ability, allowing the history of the individual user to determine what is available upon first viewing. In order to present only the portions of a web site that the user cares to utilize, the network provider would track personal usage and somehow adjust the content provided. Unlike attempts to provide content dynamically on the site level, this reduces the information needed to a fine level of granularity. The tendencies of the users of a particular site are not enough, nor are the tendencies of the network's users as a whole. Rather, the actions of the specific user are in some way monitored and transformed into an individually tailored site. This precise tracking and presenting of a site can enable to the user to much more quickly browse the internet, even on a device with more limited capabilities, while at the same time saving considerable resources for the provider. This can be accomplished through use of a personal portal that accesses only the component resources the user is most interested in visiting, streamlining the traffic for user and provider alike.

The embodiments of the present invention begin with a blank portal so that the user's first browsing step is unencumbered with a site to have to load. This is simply a file without any component resources provided for the individual. After the user visits a site and performs an action, such as logging in, accessing a form, or following a link, the action is recorded by the network provider. A browsing profile then allows the provider to count the repeat visits to that particular site. Once a certain threshold is reached, such as five visits to the particular link on a web site, that specific action is recorded as part of an updated portal for the user. The file that was previously blank then includes a URL to the component the user frequently accesses. The user that visits the general portal web site frequently, but only to check electronic mail, can have a graphic and URL necessary to login to the user's mailbox. Likewise, repeated visits to a news site for financial news will add a link to the updated portal for the site's financial news section.

This can be accomplished by introducing elements and data structures to the network that monitor and record usage, then generate a portal based on that usage data. As component resources are visited, an element at a packet data serving node (PDSN) has access to the universal resource locator (URL), which can be recorded. This process can be user specific. As new components are visited, the data structures showing usage history can be examined to verify that a component has not been previously visited. The URL associated with the component can then be added to the data structure and the count of visits can be incremented. Once the count of visits reaches a certain pre-determined number, that URL can then be automatically added to a dynamic web portal as described below. This allows the provider to only communicate the component URL rather than the entire page, saving bandwidth and user frustration both in the process.

Figure 2:
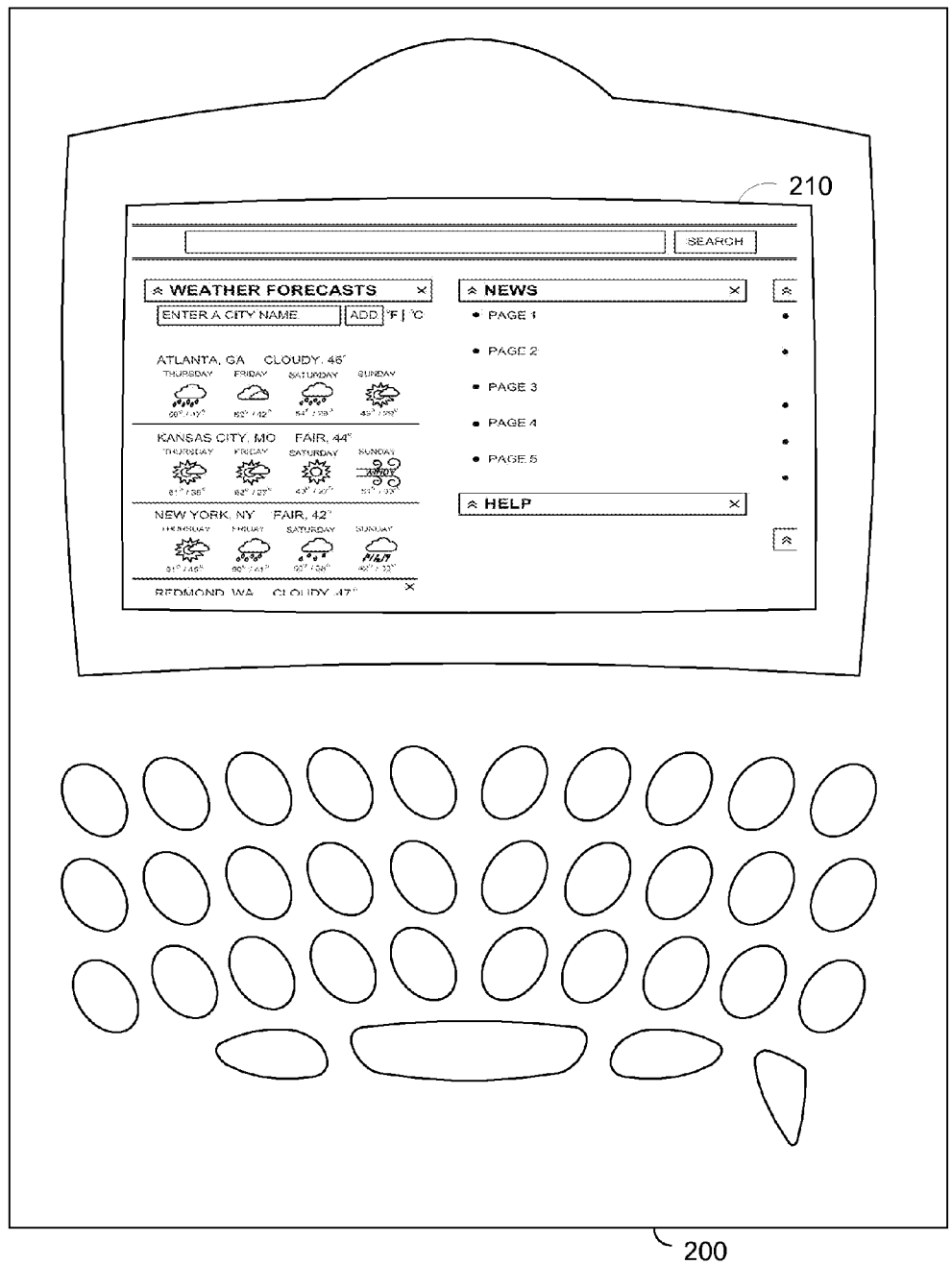

Looking now at FIGS. 1-4, exemplary simulated browser presentations on a web-enabled mobile device are depicted. Like numbers will be used throughout the figures when applicable. FIG. 1 depicts a mobile device 100 with a screen presentation 110 with a completely blank portal. This portal is available for the user to begin the browsing experience and the files used to provide this and other web sites will be described in further detail below. This blank portal can be referred to as the initialized portal, as nothing would be stored within it to present to the user. Turning to FIG. 2, mobile device 200 is shown with an unmodified screen presentation 210 of an illustrative web site. The site includes a search bar at the top, along with graphics for weather forecasts, links to news stories, and a link to a help feature. Other features of the exemplary page are only partially visible, but are part of the accessed URL as well. These are the features one would expect from a typical web site and would be indicative of the types of features a user could access in order to begin the dynamic portal generation process. The URL for this site would have been requested after presentation of the blank portal so that browsing could begin.

Figure 3:
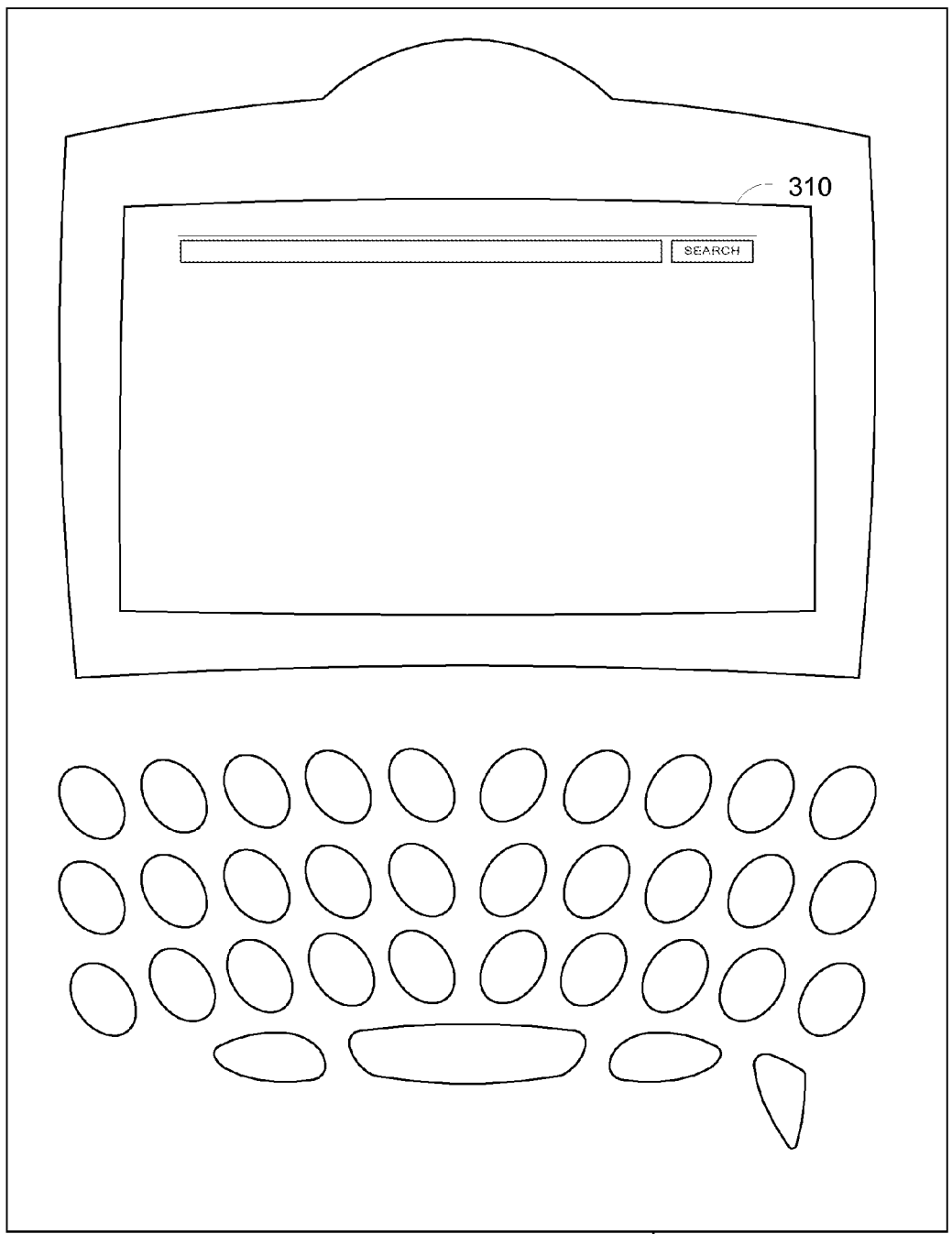

In FIG. 3, a mobile device 300 includes a screen presentation 310 that presents a very different look, the dynamically generated portal. Screen presentation 310 includes only the search bar of the previously shown URL. If this is the one component resource the user frequently requests when browsing, then the presentation can be greatly streamlined by requesting only the single item. Providing the one form the user typically accesses, seen here as the search bar form, greatly reduces the required amount of data that is transferred. This not only benefits the provider from a bandwidth consumption standpoint, but presents the user with exactly the component resources he or she prefers to access, rather than the whole of screen presentation 210 as seen in FIG. 2. The exemplary screen presentation in FIG. 4, labeled as a screen presentation 410, includes a local weather forecast in addition to the search bar. In the event that mobile device 400 was frequently requesting the full page of base URL shown as screen presentation 210, only to subsequently request the two component resources shown in screen presentation 410, these two items can replace the blank portal.

As stated above, one aspect of this system for dynamically generating portals is to track personal usage. Once that usage is monitored however, the portal page itself still requires so form of generation. This can occur through creating a file that can be used as the portal page. In the web sites given in examples above, a markup language is used to code a web site that may be served to a user with internet access. Such pages are created through conventional means that have become commonplace in today's internet environment. One way this can be done is through coding in a text program by a developer, using a language such as HTML mentioned above. Another is by the use of specially created software applications that provide a user an interface in order to generate code for those who wish to create and update pages without learning the specific coding languages. However, the portals created by embodiments of the present invention require neither of these methods, as they dynamically generate the necessary web sites used for individual portals. Rather than require the individual or a programmer to create the files that provide the content, the actions of the user create the served pages. As mentioned previously, the URLs of visited components can be recorded in a data structure along with counts of requests for those respective components. Once the threshold has been met, those URLs can be automatically coded into the portal page. The provider thereby reduces the amount of data communicated through serving web pages that simply extract frequently URLs and the web components that help to direct users to them.

As discussed above, the initialized portal begins as a blank page, which in turn can be presented by referencing a blank file. For instance, typical service requires authentication to a network, such as when a user signs up for cellular telephone service. Data, such as the user's telephone number, can be used to properly identify the device to the network. According to embodiments of the present invention, once a user authenticates to a provider's network for the first time to browse the internet, a file can be created that contains no content of any sort. This file will be specific to the user, or more specifically to the authenticating device. Subsequent browsing actions that are repeated more than a specified number of times can lead to updates to the blank portal file. Using an example mentioned above, repeated visits to a user's electronic mailbox can add the associated component resource, i.e. the mailbox graphic and link to the login URL, to the portal. Perhaps instead the login form for the mailbox user may be used directly. However, only the less-consumptive URLs will be included, omitting the various aspects of the same page that the user does not typically use. Using the user's own requests, e.g. for a link, the required code can be generated without further intervention by injecting the required URL.

Figure 5:
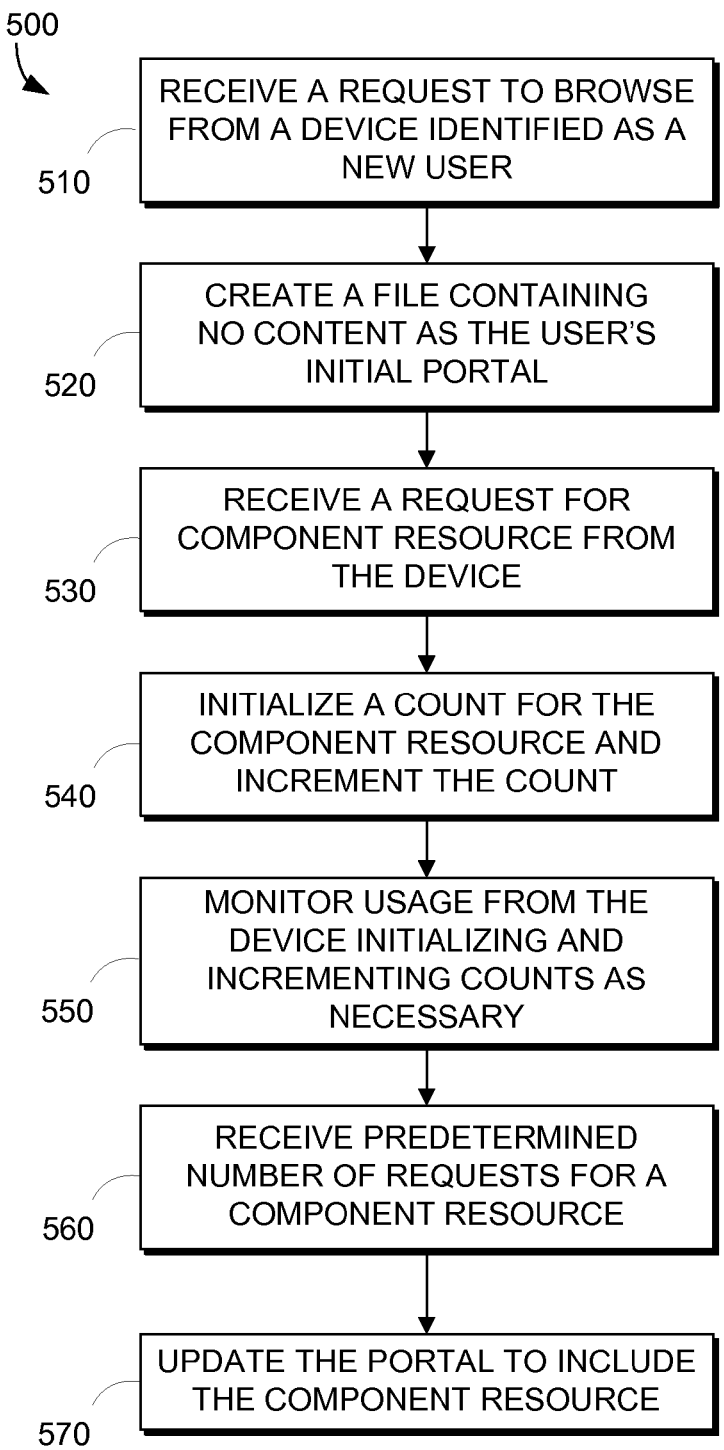
FIG. 5 is a flowchart showing a method of generating dynamic portals based on personal usage in accordance with embodiments of the present invention.

A method is shown in FIG. 5 that can be used to create individualized portal files that can be presented to a user. At a step 510, a first request from a user or device is received. This can be the detection of a new device on the provider's network, or a user that has recently signed up for service by the provider. This can be verified by examining a data store and determining that no portal file exists for the user in question. A file containing no content is generated at a step 520, in order to present a blank page as the user's initial portal. At a step 530, an action has led to a request for some component resource, such as a link or a form. This action is recorded, which creates a new count for that component resource and is initialized at zero. The count is incremented at a step 540. As the user continues to browse web sites, a step 550 is used to initialize and increment new and existing counts as necessary. At a step 560, a predetermined threshold of requests for a component resource is exceeded, leading to an update at a step 570. This update adds the URL of the requested component to the portal file so that the component is now presented with the portal.

This method can be repeated as the device places additional repeated requests, so that multiple component resources are available. Following the examples outlined above, the user who has a mailbox login, a specific news web site page, and a fantasy sports login could have all three of those items presented as the user's portal. The URLs for the component resources all are added as the threshold for visiting the sites are surpassed. This leads to a larger file than the blank portal previously presented, but that may be much smaller than any one of the pages from which the component resources are requested. The three separate components are necessarily smaller than the information required to communicate all three full pages. By saving the URLs to the component resources in the user's portal file, the provider can reduce the amount of data that needs to be communicated, possibly on an orders-of-magnitude scale. This also can give the user a more pleasurable browsing experience, as their preferred content is automatically presented upon starting a browsing session.

Figure 6:
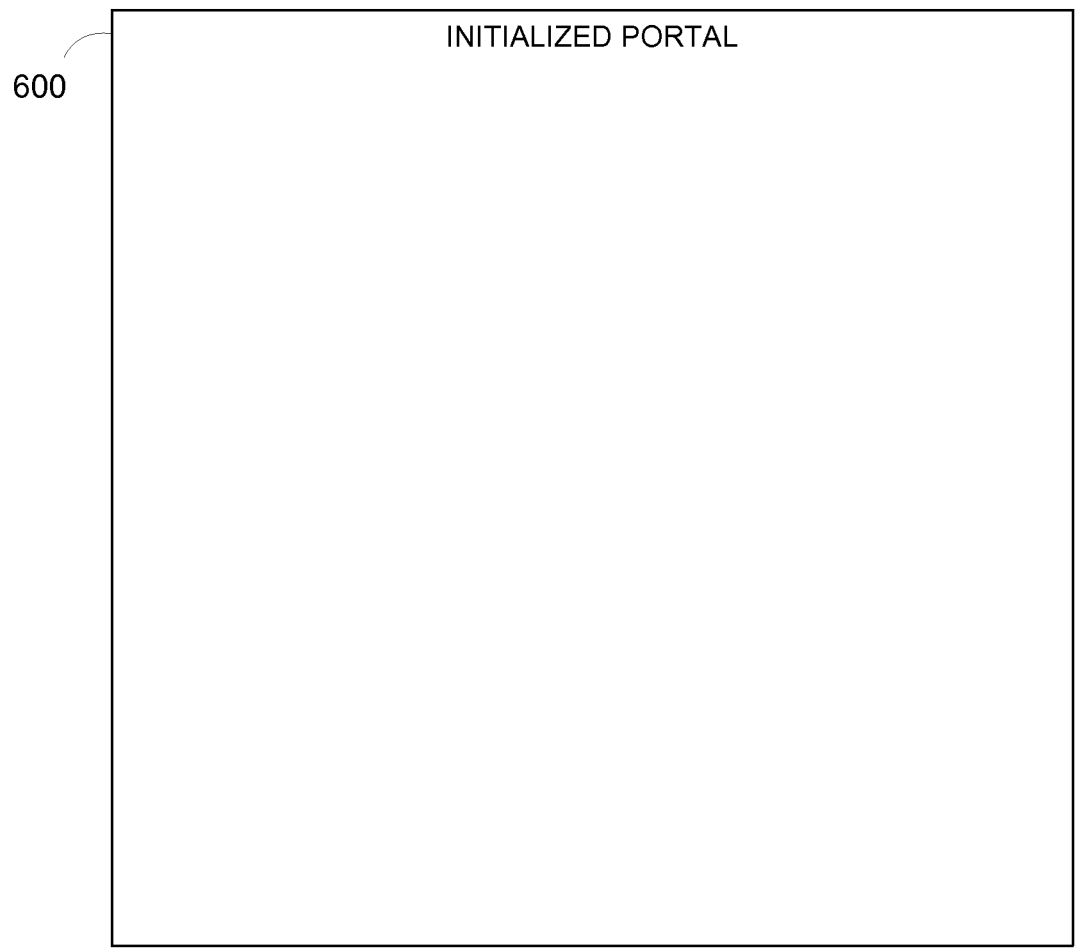
FIGS. 6-8 are simplified representations of files used to provide portals according to embodiments of the present invention.
Figure 7:
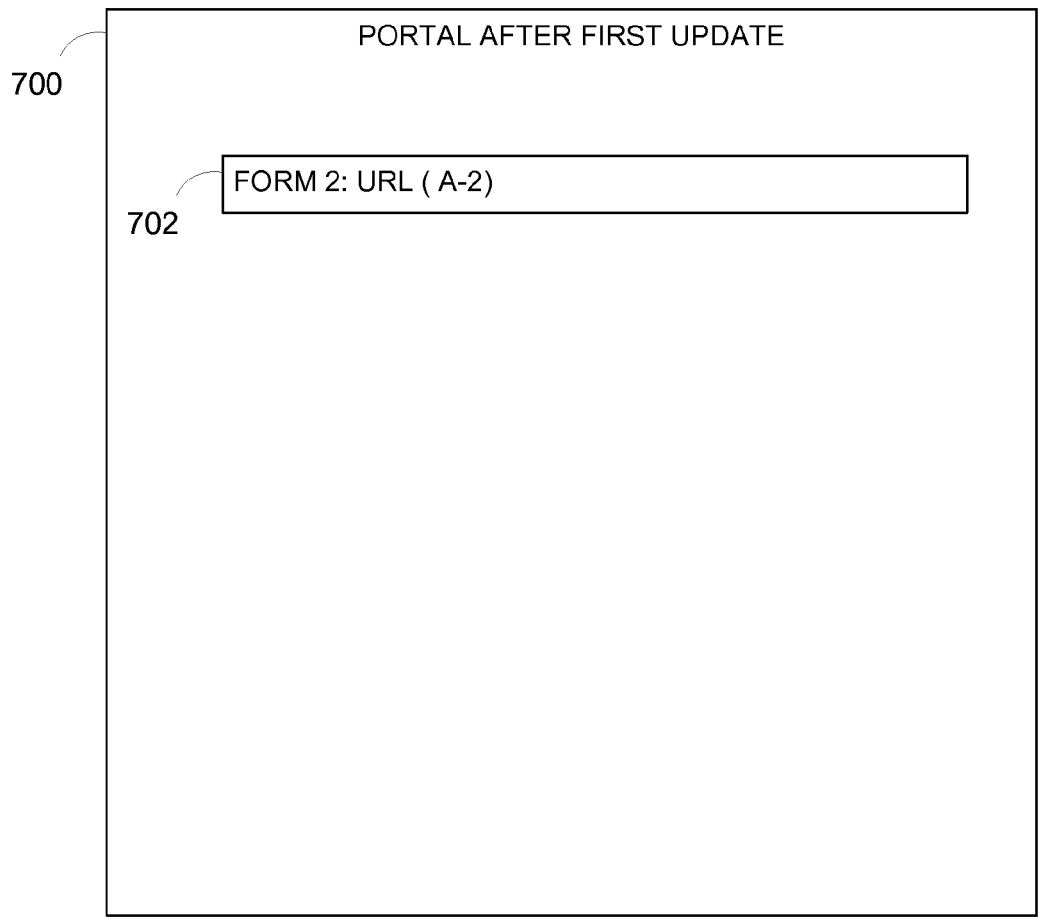
Figure 8:
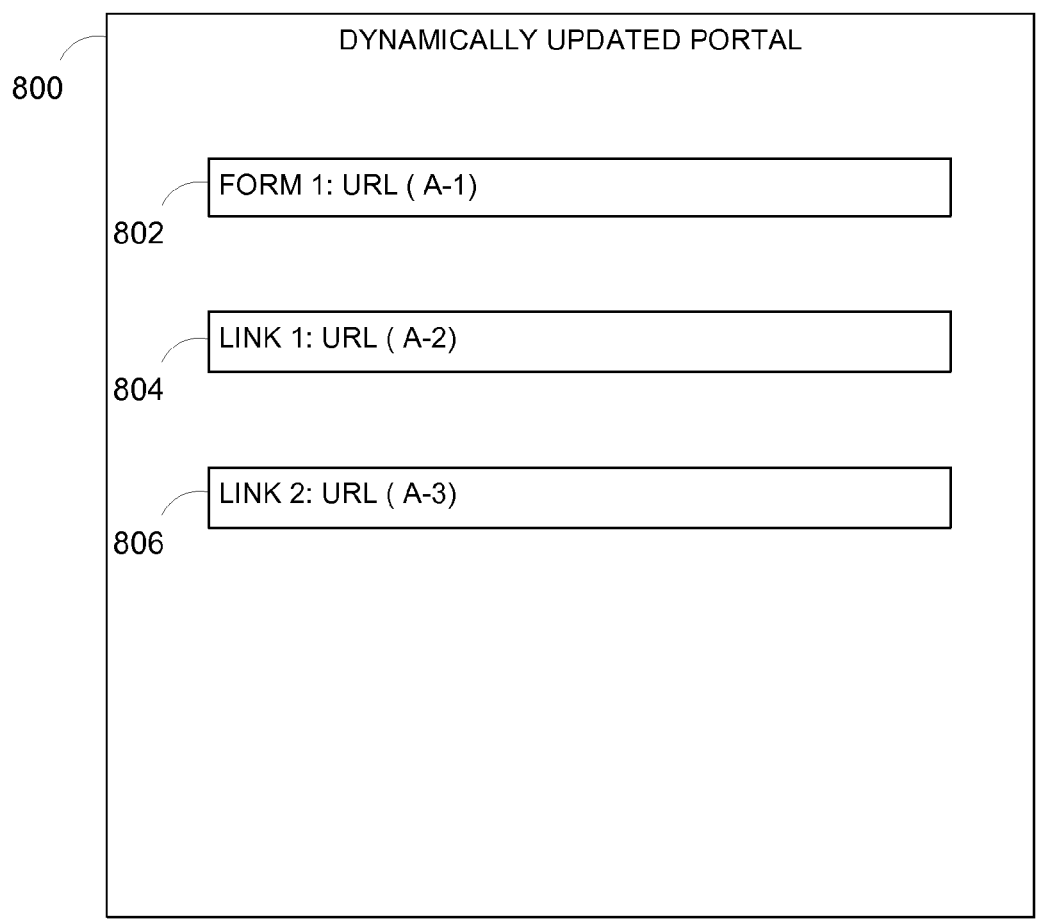

Turning now to FIGS. 6-8, simplified diagrams of files used for creating dynamically generated portals are shown. FIG. 6 depicts a simplified file at an initialized portal, that is denoted as file 600. This is also marked as "Initialized Portal" along the top of the file. This could be any web page using a programming markup language mentioned above, such as HTML, XML, or XHTML. Because the portal is blank, the corresponding file is blank and does not contain any coding or content. A simplified form of a portal after update 700 is given in FIG. 7. This is listed as "Portal After First Update" to show that one component has been added. Rather than direct a user to a page with everything included, as would be done with a traditional URL "bookmark," file 700 has just a single component, depicted as URL 702. File 700 would replace file 600 presented to the user at the start of a browsing session. For the sake of this figure, a web form has been selected as the repetitively accessed resource. Using one example from above, one might think of URL 702 as the login form from an electronic mailbox. If the user only goes to a general portal site to access its mailbox feature, which is what this form presents a user, then URL 702 would allow the user to skip the entirety of screen presentation 210. Simplified screen presentation 310 is returned instead. While the references of screen presentation 210 to picture files, graphics, links, forms, and flash objects may take up hundreds of kilobytes, the streamlined presentation of file 700 may take up only a few kilobytes of processing and network resources. Thus, by presenting only what the user truly wants to see and use, network traffic can be greatly reduced. According to embodiments of the present invention, this coding takes place automatically. The repeated requests for form-A represented by URL 702, result in writing that URL to the user's portal file.

The term dynamically generated portal refers to the continuous ability to update this file. FIG. 8 shows a file 800 that is labeled "Dynamically Updated Portal" at the top. File 800, which replaces file 700, contains a URL 802. This is depicted as a URL to a form once again and could be the same URL as shown previously as URL 702. File 800 also includes a URL 804 and a URL 806. Both are labeled as links, meaning that a particular URL is frequently accessed. Once again looking at the examples above, these links could be to specific areas of web sites, such as a new site. They could just as easily be to any other site, such as a personal blog or a social-networking site. This is not meant to constrain the present invention to specific web sites including specific proportions of component resources. Rather, file 800 is given to provide illustration only and should not be construed as limiting. Any number of component resources could be presented and fall within the scope of the present invention.

The types of resources shown and the manner with which they are presented can be varied in nature. As new resources are added to the portal file, the most recent can be shown at the top of the page, in order to keep the most contemporary items at the most visible location. In the above figures, if the form of URL 702 was included in the portal file and later the links of URLs 804 and 806 were added, links 804 and 806 could be presented at the highest point of the page. This could be followed by URL 802 (which, for the sake of the example is the same as URL 702). Another way in which to present the portal page would be to present the most recently requested at the top. Thus, a link could be added in a subsequent session, but if the first-added form is later requested, the form moves back to the top of the page.

However, this temporal decisioning of the portal layout is not required. As an alternative, the frequency with which items are viewed can be a determining factor in the layout of the portal. If a first URL is found to be visited twice as often as a second URL, which is in turn more frequently utilized than a third URL, the top-to-bottom ordering could be set accordingly as the first, second, and third URLs. The frequency with which the pages themselves are updated can be a determining factoring in which should be displayed most prominently. A link to a page that is updated daily may be more appropriately presented at the top of the page than one that is only update sporadically. There are still other schemes available for the layout and arrangement of the portal page. As another example, the items could be arranged with forms on top, as they require entry by the user, followed by links and other objects below. The component resources could be arranged by file size, so that the items that load most quickly are at the top, while those that take the longest to load are at the bottom of the page. All of these potential arrangements and update methods are merely illustrative in nature and are not to be construed as limitations, as many more could fall within the contemplated scope of the present embodiments of the invention.

Figure 4:
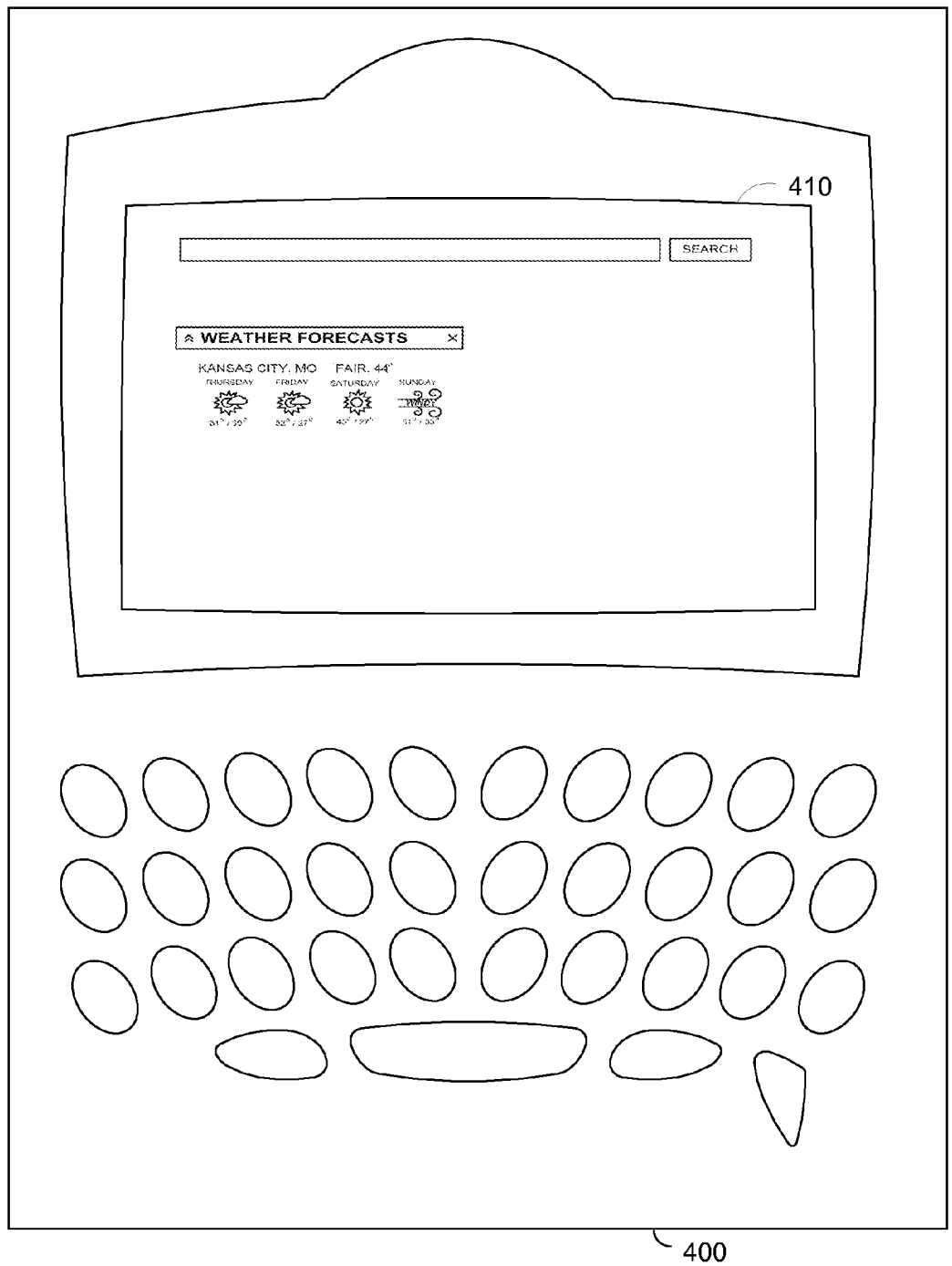

A further level of dynamic adaptability could be added by basing the presentation of component resources on the location of the requesting device. Therefore, a user that normally receives a weather forecast as shown in FIG. 4 could receive the forecast based on the device's current location. If requests are made repeatedly to check a component resource that is based on a location other than the device's current location, then an overriding factor based on the repeated requests can be placed on the portal generating rules. Once a component resource is placed in the portal file, a corresponding link to the component's full page may be given to the user. Thus, a link to the financial news section of a web site can also have an accompanying link to the web site's full representation. Likewise, the login form for an electronic mailbox may also have the general portal's index page presented below the form. Of course, another option is to present a link to disable this dynamic generation altogether, so that the user may set a home page for browsing that includes an entire, standard-presentation web site page.

Figure 9:
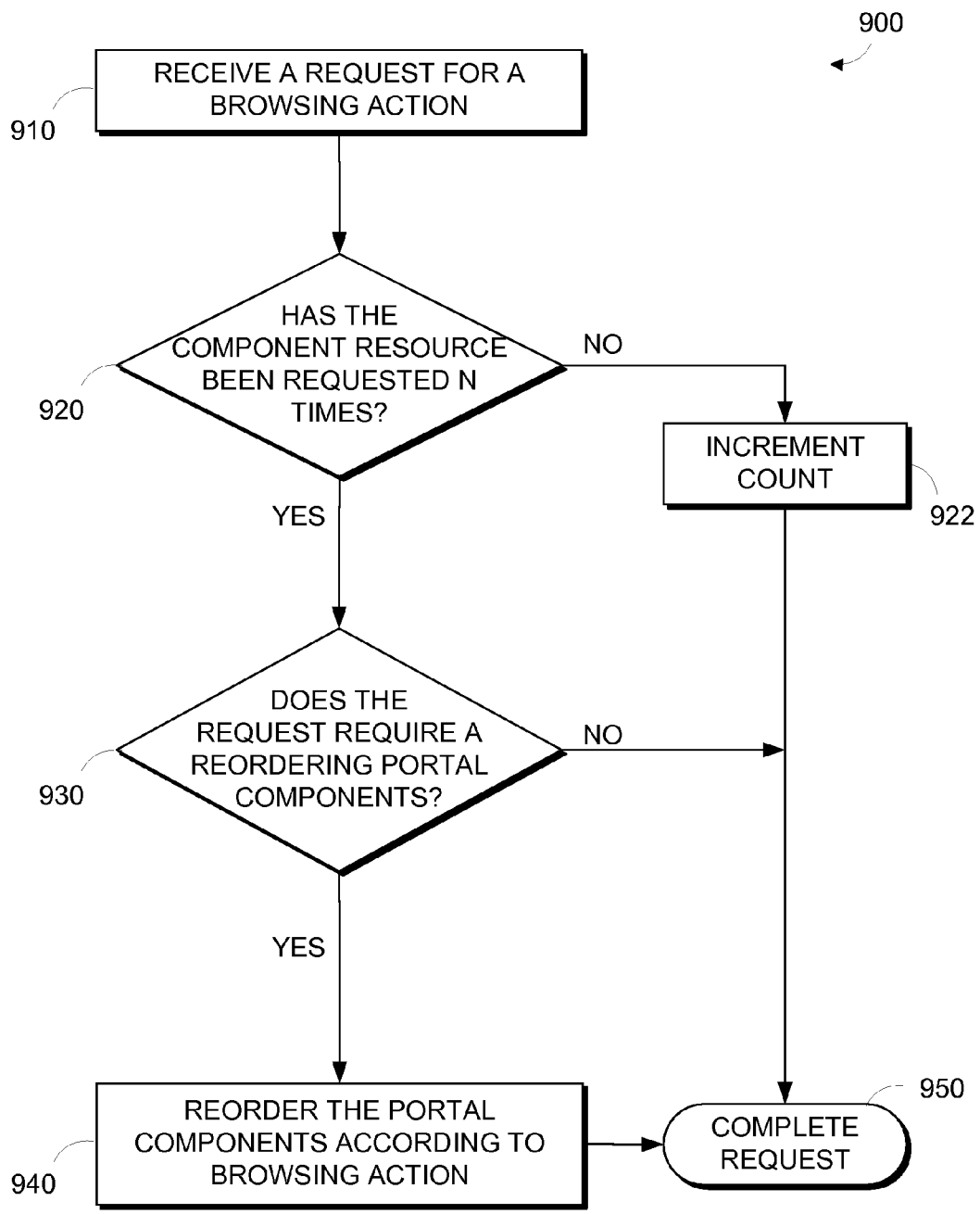
FIG. 9 is a flowchart showing a method of updating dynamic portals based on usage history in accordance with embodiments of the present invention.

FIG. 9 depicts a method 900 of updating the portal file that will now be described within the context of the above examples. At a step 910, a browsing action of some sort is received. This could be following a link, using a form, or completing any other web-based action. At a step 920, whether or not the component has been requested the requisite number of times for addition to the portal is determined. If it has not, the count is incremented at a step 922 and the request is completed at a step 950. If the threshold has been previously surpassed, then the component is already stored in the portal file. If the request passes the threshold, then the component is added to the portal. A determination of portal reordering is made at a step 930, so that the portal may be properly displayed upon the next login. This can follow any one of the above mentioned methodologies for determining the necessity of re-ordering. If no re-ordering is required, then the request is completed at step 950 as previously seen. However, if re-ordering the portal components is necessary as a result of the browsing action, a re-ordering step 940 is completed prior to completing the request at step 950.

Systems now will be described so that certain embodiments may be practiced in accordance with the present invention. The claimed embodiments can be used on a network, which will be described in the context of a cellular telecommunications network. The network will be described having a portion denoted as providing connectivity services, also referred to as a connectivity services network (CSN), and a portion providing access services, also referred to as an access service network (ASN). In reality, these portions overlap in terms of architecture and function, and therefore should not be thought of as distinct networks or sub-networks. Accordingly, networks providing access services will be described and shown as cellular towers used in conjunction with base transceiver stations (BTSs). However this is not necessary for practicing the claimed embodiments of the present invention. For instance, a system using a "femtocell" unit for indoor reception would be of equally beneficial use. A network using any one of a variety of access methods could be used, such as a conventional code division multiple access (CDMA) protocol cellular network. Likewise, a data-only network, such as one compliant with the Evolution-Data Only revision A standard (EV-DOa) can be used. Other data-only access networks include wireless microwave access networks, such as those following the Worldwide Interoperability for Microwave Access (WiMAX) protocol promulgated by the WiMAX Forum® and administered at Beaverton, Ore. The protocol used to provide access does not limit the embodiments of the present invention as any network sending and receiving information can be enhanced through use of these methods.

A system is contemplated according certain embodiments of the present invention using a device, a packet data serving node (PSDN), and a web server. The web server can be contained within a network that provides connectivity services. Alternatively, the web server can be available via a CSN by way of the internet. The network providing connectivity services includes a number of elements that connect one or more access networks and other basic functions, such as authentication, billing, services, and maintenance. It should be understood a CSN, when implemented, will likely include hundreds or thousands of components. The number, configuration, and complexity of devices will be determined by the size of the provider network. While this may be a complex network of numerous elements, only those most used in the dynamic portal generation processes will be described.

One aspect of the present invention is the connection between the packet data serving node and a mobile device that is connected via a network providing access services. When the mobile device makes a request to for specific resources on a web site, a gateway will receive the specific request. The gateway is a translation point between the radio access network and the packet-based core network or CSN. In this context, the gateway is part of the PDSN. The PDSN can also include a store of information based on users, including portals for initial browser presentation, updated portal files, and other data used for monitoring network usage. Because of this communication and capability, the requests made by a device can be monitored to create dynamic portals. All subsequent requests from the mobile device to any web server will be processed through a gateway of some sort. If all gateways are communicating with an appropriate data store to determine if a dynamic portal is available for the device, then bandwidth can be preserved by presenting only the streamlined portal. The start of a browsing session can be directed to a stored URL, such as the generated portals described above. If the customized portal is presented to the device, communications with a web server can be expedited by requesting only the component resources needed. A gateway and data store can be implemented together, so that the a user in a given access network has a portal available on his or her home network. Likewise, the portals could be stored centrally on a data store within the CSN. This allows any gateway to contact the core network and retrieve a streamlined portal, regardless of the user's location.

A gateway can be in communication with a data store for portals in conjunction with, or separately from, its communication with a web server. Thus, a second gateway can be connected to its own access network. By providing a data store as a central repository of portals, any request on the network may be examined to provide a dynamic portal, if it is so desired. Therefore, when a device moves to a different access point, the data store can be referenced just as it would if the device sent any subsequent requests from the original access network. While this may add an additional request on the network providing connectivity services, this request still may be of considerable savings when compared to completing all requests for complete web pages rather than just the component resources.

Figure 10:
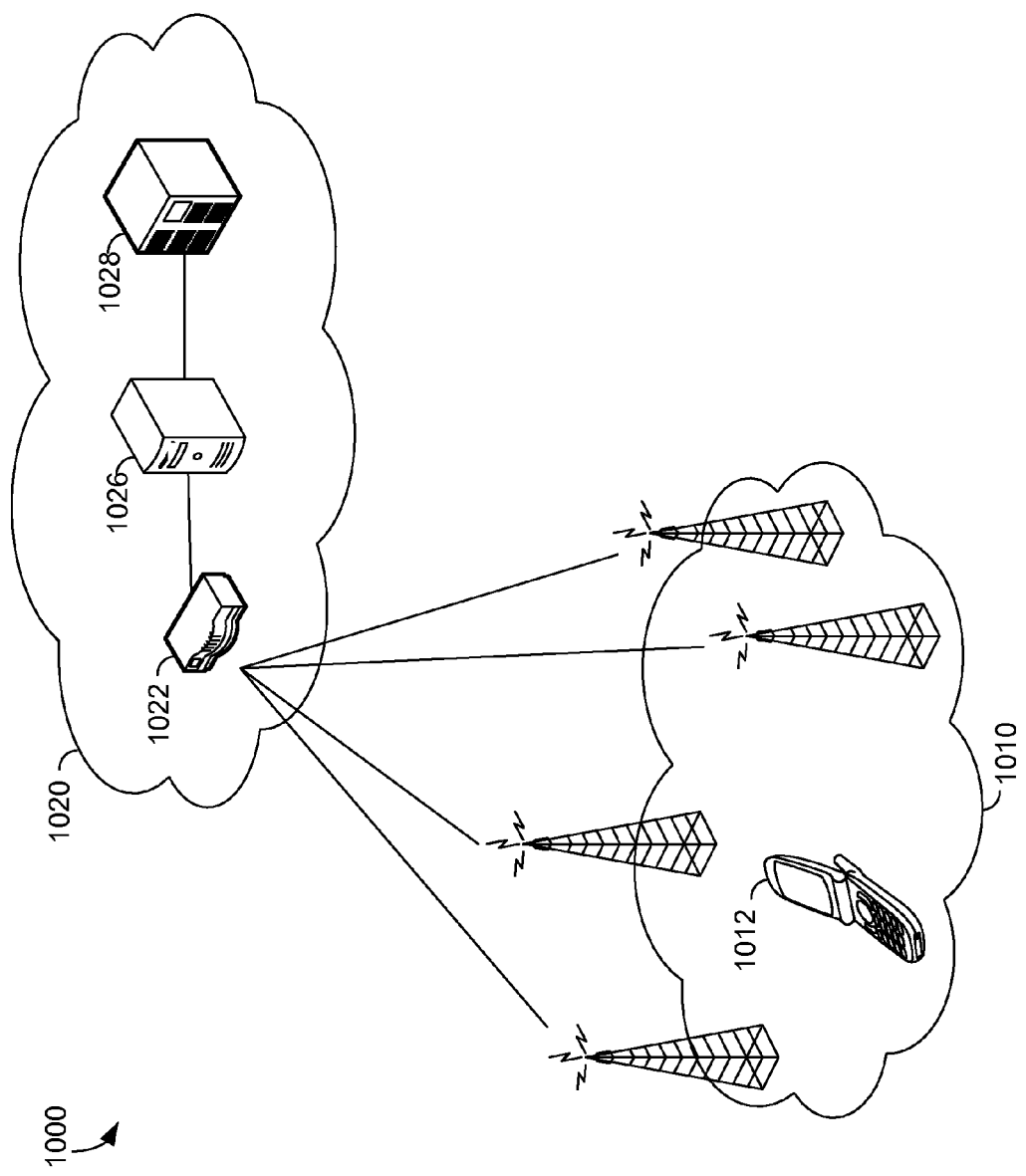
FIGS. 10 and 11 are exemplary systems within which the embodiments of the present invention may be practiced.
Figure 11:
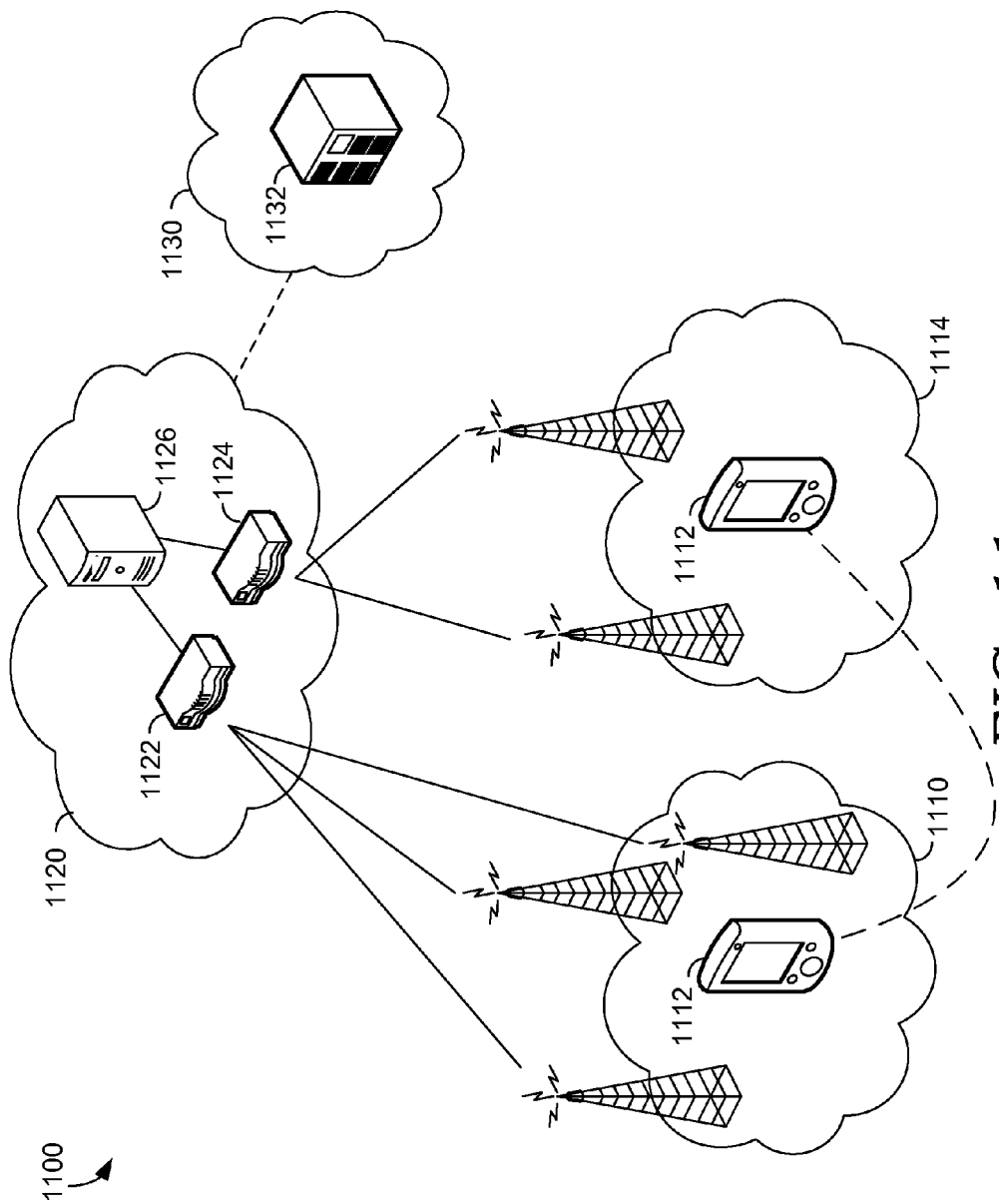

Looking now to FIGS. 10 and 11, exemplary systems with which embodiments of the present invention may be practiced are depicted. The systems shown are greatly simplified and will be described within the context of the environments in which they may be included. Thus, the systems shown are not intended to be exclusive of other devices also included on a telecommunications network. System 1000 shows a mobile device 1012, that can be used on network 1010 to browse internet web sites. Mobile device 1012 is shown as a web-enabled cellular phone, however this is not a requirement of the system. Rather, any web-enabled device could also employ embodiments of the present invention. A system of two devices along with a server are shown within a network that provides connectivity services, denoted as network 1020. Included on network 120 are a gateway 1022, a data store 1026, and a web server 1028. It should be understood that network 1020, when implemented, will likely include many more components than shown. However, for the sake of clarity, only the above devices are depicted.

It should also be noted that server 1028, which is configured to provide web serving functions, need not be located on network 1020. Rather the communication depicted between gateway 1022 and server 1028 could easily cross two separate networks or many different networks in between as server 1028 provides web site files via the internet. When mobile device 1012 makes a request to gateway 1022, a portal created or stored on data store 1026 can be accessed. Subsequent requests through gateway 1022 can provide updates to the portal file or require that the portal file be accessed. While shown as two separate devices, gateway 122 and data store 126 can be implemented together. Thus, any gateway on network 120 can be configured to have its own data store of portals.

The devices shown in a system 1100 are similar in nature to those in system 1000, but are configured in a slightly different manner. There again is a network 1110 for access and a mobile device 1112, in this figure represented by a hybrid PDA and cellular telephone device. However, server 1132 is now shown as located on the internet, numbered as internet 1130. The coupling of network 1120 and internet 1130 is shown with a dashed line to indicate the variable nature of this communication flow. Also depicted differently is the gateway-data store configuration. Gateway 1122 is now in communication with data store 1126, but separately from its communication with server 1132. This is to indicate a central data store on the network that may be accessed from any device completing such requests. To reinforce this idea, a second gateway 1124 is shown that is connected to its own access network 1114. By providing data store 1126 as a central repository of dynamic portals, any request on the network may be begin with a streamlined portal. Therefore, when device 1112 moves to a different access point, for example on network 1114, data store 1126 can be referenced just as it would if device 1112 sent any subsequent requests from network 1110. While adding an additional request on network 1120, this request may be of considerable savings than completing a request that includes all component resources of the given URL.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method of generating a dynamic web portal associated with a user based on personal usage history of the user, the method comprising:
   generating an initialized web portal that contains no web content at the start of a first web browsing session;
   receiving a first request to retrieve one or more first component resources from one or more visited web pages via a first gateway, the first request made via a first reference in a first visited website of the one or more visited web pages;
   receiving a second request to retrieve one or more second component resources from the one or more visited web pages via a second gateway, the second request made via a second reference in a second visited website of the one or more visited web pages, wherein the first gateway differs from the second gateway, and wherein the first visited website differs from the second visited website;
   storing the first and second references associated with the one or more first and second requested component resources in a network data store, wherein each of the one or more first and second requested component resources comprises at least one of: a form field, a portion of a code, and a flash object;
   monitoring subsequent requests to determine that the first and second requested component resources have been subsequently requested;
   determining that a total number of subsequent requests for first requested component resource from a first visited web page exceeds a predetermined threshold;
   adding the first reference associated with the first requested component resource from the first visited web page to the web portal; and
   presenting an updated web portal that includes the first and second references associated with the first requested component resource from the first visited web page and the second requested component resource from a second visited web page.

2. The method of claim 1, wherein presenting an updated web portal comprises presenting the one or more first and second component resources in an order based on frequency of requests with respect to the one or more first and second component resources.

3. The method of claim 2, wherein presenting the one or more component resources in an order based on frequency places one or more most-requested component resources of the one or more first and second component resources at the top of the portal.

4. The method of claim 3, wherein presenting an updated web portal comprises presenting a link to retrieve a base URL to the visited web page that contains the reference associated with the one or more first and second component resources.

5. The method of claim 4, wherein the one or more component resources include at least one of a hyperlink, a picture, a graphic, an audio file, and a video file.

6. The method of claim 5, wherein presenting an updated web portal comprises presenting a link to disable dynamic portal generation.

7. One or more non-transitory computer-readable media having computer-executable instructions embodied thereon that, when executed, perform a method of generating dynamic web portals associated with a user based on usage history of the user, the method comprising:
   identifying a first request to retrieve a first component associated with a first reference via a first gateway;
   identifying a second request to retrieve a second component associated with a second reference via a second gateway, the first and second references being a universal resource locator (URL) or a portion of code, the first request being received via the first reference in a first visited website of a first source of web pages and the second request being received via the second reference in a second visited website of a second source of web pages, wherein the first website differs from the second website, the first and second components each comprising at least one of: a form field, a portion of a code, and a flash object;

storing the first reference associated with the first component and the second reference associated with the second component in a central repository of dynamic portals;

incrementing a count of requests for the first component and the second component upon each subsequent request for the first component and the second component;

determining that the count of requests for each of the first component and the second component exceeds a predetermined threshold number of counts;

generating a dynamic portal that contains the first and second references associated with the first and second components and an associated link to retrieve a base URL for the respective source web page that contains the first and second references, the dynamic portal being displayed by a web browser at the beginning of a web-browsing session, the dynamic portal displaying the first and second components based on the first and second references associated with the first and second components, and the dynamic portal including the first and second references associated with the first and second components from a first and second plurality of source web pages and being a substitute for the first and second plurality of source web pages, the first plurality of source web pages being different from the second plurality of source web pages; and communicating the dynamic portal to the requesting device.

8. The media of claim 7, wherein the first component and the second component are at least one of a hyperlink, a picture, a graphic, an audio file, and a video file.

9. The media of claim 7, wherein the dynamic portal is arranged with most-requested components at the top of the page.

10. The method of claim 7, wherein generating the dynamic portal comprises adding to the dynamic portal a link to disable dynamic portal generation.

11. A system for generating a web portal associated with a user that is dynamically configured to present component resources of web pages to a device based on usage history and frequency of the user, the system comprising:

one or more network elements, the one or more network elements configured to monitor requests from different geographic locations for web resource components, and generate and update a plurality of web portals comprising web resource components based on a current location of a user's device for the user, each web resource component having an associated reference; and a non-transitory computer medium embodying a data structure that stores a count of the number of requests for each of the web resource components for the one or more network elements, and dynamically updates and stores a plurality of web portals of the user based on the number of requests for the web resource components and on the geographic location of the device of the user from which the requests are made, the web portal being dynamically updated to include web resource components for which the number of requests exceeds a predetermined value, and the web portal including the associated references to the web resource components, wherein each of the web component resources is directly retrieved from a respective website, and wherein each of web component resources comprises at least one of: a form field, a portion of a code, and a flash object.

12. The system of claim 11, wherein the one or more network elements monitor requests according to an identifier associated with each device.

13. The system of claim 11, wherein the web resource components include at least one of a hyperlink, a form, a picture, a portion of code, and an object.

14. The system of claim 11, wherein the requests are monitored according to a user profile.

15. The system of claim 14, wherein each request for a web resource component increments the count for that web resource component.

16. The system of claim 11, wherein the one or more network elements are located at a packet data serving node.

* * * * *